No. 792,331. PATENTED JUNE 13, 1905.
C. & J. T. KERR.
EXCAVATOR.
APPLICATION FILED FEB. 1, 1904.
3 SHEETS—SHEET 1.
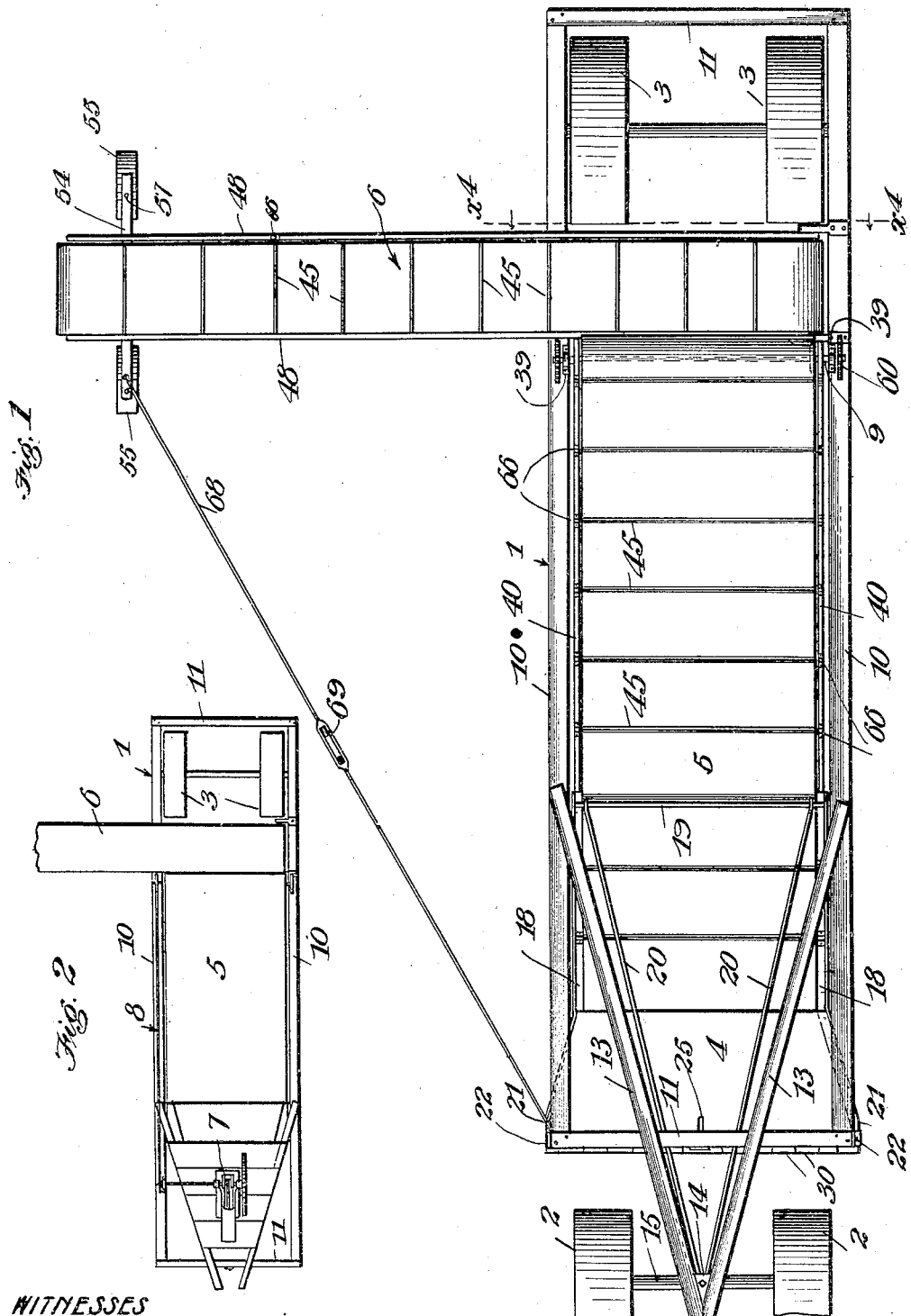

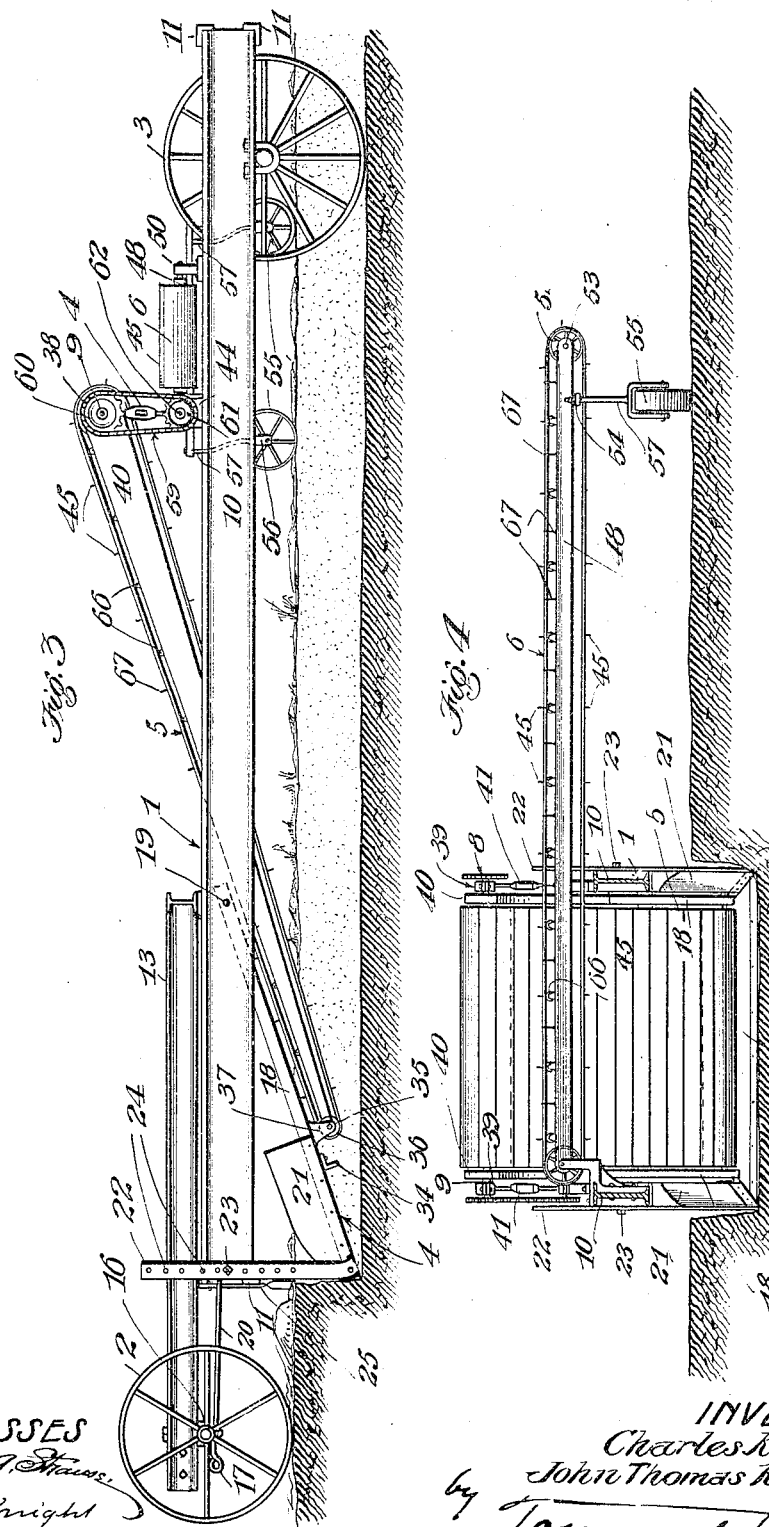

No. 792,331. PATENTED JUNE 13, 1905.
C. & J. T. KERR.
EXCAVATOR.
APPLICATION FILED FEB. 1, 1904.
3 SHEETS—SHEET 3.
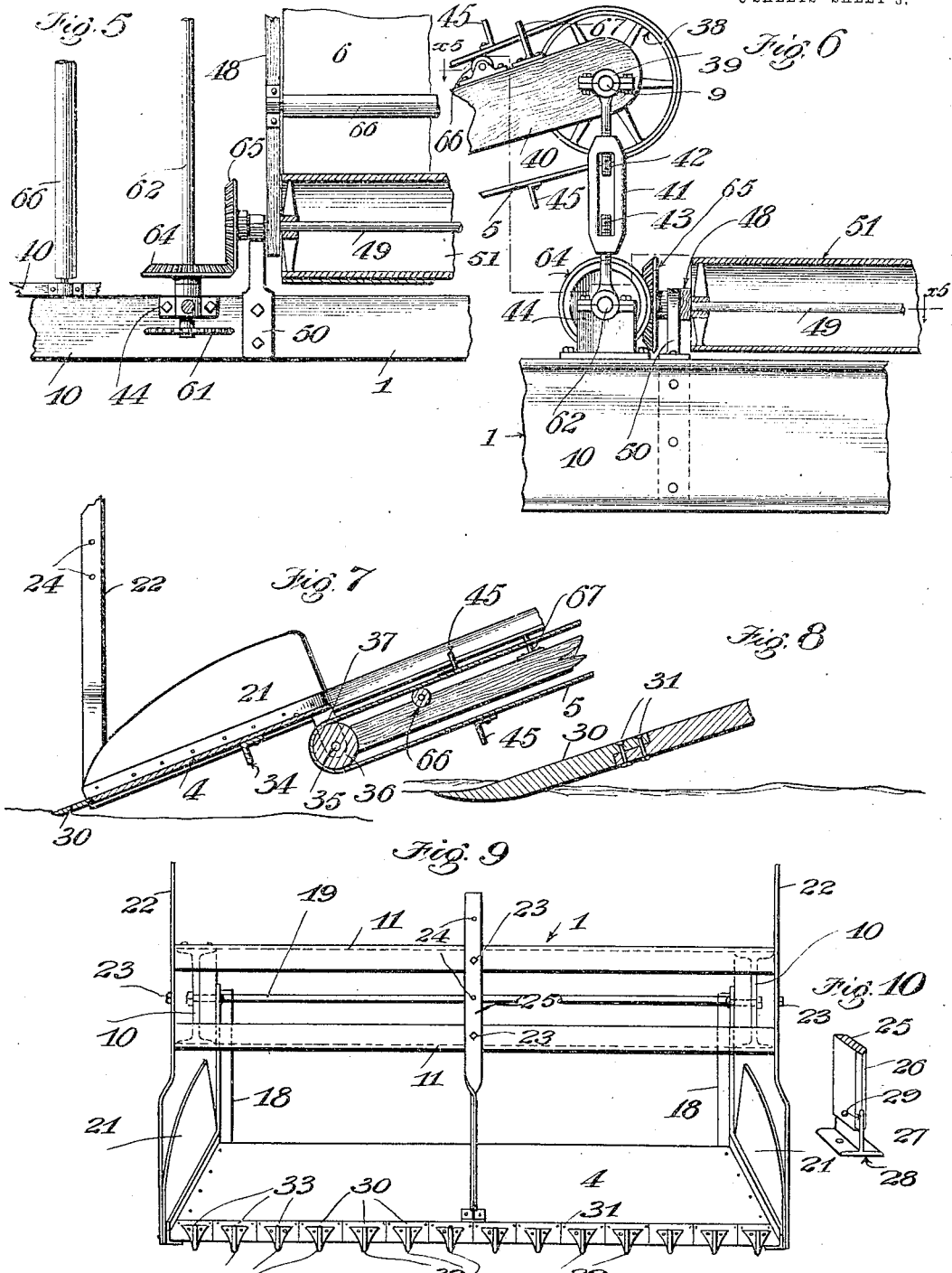
WITNESSES
O. P. Knight
INVENTORS
Charles Kerr
John Thomas Kerr
by Townsend Bros Attys No. 792,331.

Patented June 13, 1905.

UNITED STATES PATENT OFFICE.

CHARLES KERR AND JOHN THOMAS KERR, OF ARMADA, CALIFORNIA.

EXCAVATOR.

SPECIFICATION forming part of Letters Patent No. 792,331, dated June 13, 1905.

Application filed February 1, 1904. Serial No. 191,429.

*To all whom it may concern:*

Be it known that we, CHARLES KERR and JOHN THOMAS KERR, citizens of the United States, residing at Armada, in the county of Riverside and State of California, have invented new and useful Improvements in Excavators, of which the following is a specification.

This invention relates particularly to improvements in excavators for ditching or similar purposes; and its primary object is to provide means for rapidly and economically excavating ditches, especially ditches of large cross-section requiring removal of large amounts of material and its transportation to a considerable distance laterally of the ditch.

A further object of the invention is to construct the excavator-frame and operating devices in such manner as to obtain maximum strength and durability.

Another object of the invention is to provide for adjustment of the excavating devices, so as to vary the depth of excavation as desired.

The accompanying drawings illustrate the invention.

Figure 1 is a plan of the excavator with the operating-engine removed to more clearly show the underlying parts. Fig. 2 is a diagrammatic plan of the excavator complete, showing the connections of the driving-engine. Fig. 3 is a side elevation of Fig. 1. Fig. 4 is a vertical section on line $x^4 x^4$ in Fig. 1. Fig. 5 is a detail section, on the line $x^5 x^5$ in Fig. 6, of the connecting-gear for the apron mechanism. Fig. 6 is an elevation transverse to Fig. 5 with one of the drums in section and the sprocket devices omitted. Fig. 7 is a detail section of the shovel or scraper. Fig. 8 is an enlarged detail of the shoe at the front edge of the shovel or scraper. Fig. 9 is a front elevation of the shovel or scraper. Fig. 10 is a detail of fastening means for a shovel-adjusting bar.

1 designates the main frame of the excavator, supported by forward truck-wheels 2 and rear truck-wheels 3. A shovel or scraper 4 is pivotally and adjustably connected to the main frame, so as to extend forwardly and downwardly to penetrate the ground the desired distance. An apron or conveyer 5 extends upwardly and rearwardly from the rear of this shovel or scraper to remove the material therefrom, and a discharge or delivery apron or conveyer 6 extends laterally from the rear end of the conveyer 5 to carry the material therefrom to the side of the ditch.

The conveyers 5 and 6 are formed as endless belts, driven by any suitable means, such as an engine 7, (see Fig. 2,) mounted on the frame 1 and connected by sprocket devices 8 with the shaft 9 of the rear drum of conveyer 5, and said shaft being connected by means hereinafter described to drive the other conveyer, 6. The frame 1 desirably consists of two side bars or reaches 10, preferably of metallic I-beams connected at their ends by angle-iron cross-bars 11. At its forward end this frame is connected to the forward truck-wheels by a forward or draft frame consisting of two I-beams 13, each attached at its rear end to a reach-bar 10 and extending forwardly and inwardly so as to meet at a point forward of the main frame 1, the two bars 13 being connected at such point by a wedge-block 14, to which they are secured, such block being connected or pivoted to the main swivel-block 16 for the axle 15 of the forward truck-wheels. These bars 13 being secured to the angle-iron 11 at the forward end of the main frame 1, where they cross the same, serve as braces for said main frame. Such construction also enables the strains arising from the weight of the apparatus or thrust of the shovel to be distributed more evenly over the main frame.

Any suitable traction means may be used in connection with this invention—as, for instance, a traction-engine or team connected to the swivel-block 16 of the forward truck-wheels 2 by clevis means 17.

The shovel or scraper 4 is carried by side bars 18, extending upwardly and rearwardly and pivoted at their upper rear ends on a bar 19, extending across the main frame 1. Brace-rods 20 may be provided, extending diagonally rearward from the block 14 to the rod 19, near the respective ends thereof, so as to communicate the rearward thrust from the shovel or scraper 4 directly to the point of traction, thus relieving the main frame of such strain. The side plates 21 of the scraper are fastened to side bars 18 and, together with said bars, taper or converge toward the rear.

Means are provided, preferably at the extreme forward end of the shovel 4, for retaining the shovel in definite relation to the frame 1, the said means being desirably adjustable, so as to vary the height of the shovel. Such means are here shown as consisting of bars 22, pivoted at each side of the shovel or scraper and extending upwardly along the side of the side bars 10, to which they are secured by bolts 23, said bars having a plurality of perforations 24, adapted to be traversed by said bolts 23, so that by using one or the other of these perforations the bars 22 may be set at any desired height to give the proper depth of cut with the shovel or scraper. With a wide scraper it will be desirable to provide a similar bar at the center or intermediate the sides thereof, as shown in Fig. 9, said bar (indicated at 25) being pivoted to the front end of the scraper about midway of its width and extending upwardly for attachment to the angle-irons 11 at the front end of the main frame, a series of perforations 24 being provided in said bar to permit of its adjustment at different heights by bolts 23 passed through said perforations and through the angle-irons. The lower portion of bar 25 is turned edgewise to the direction of movement, so as to oppose less resistance to the entrance of the dirt into the shovel, and has a knife-edged front 26 for the same purpose. At its lower end this bar is fastened to the shovel by a rib 27 of a T-iron or lug 28, fastened to the shovel and extending up into a slit 29 in the bottom of said bar 25. (See Fig. 10.)

The forward end of the shovel or scraper 4 is desirably provided with detachable shoes or wearing-plates, so as to enable the cutting edge of the scraper to be removed and renewed or sharpened when desired, and this cutting edge is desirably formed in a plurality of sections 30, as shown, detachably secured by bolts 31, so that in case any one section is injured or broken it may be removed without the expense of renewing the entire cutting edge of the shoe, the cutting edges of these sections being arranged in the same line. Any desired number of these sections may be provided with teeth or bull-noses 32, projecting forward of the cutting edge and adapted to penetrate and break up the earth in advance of the cutting edge. Said bull-noses or teeth may have vertical ribs 33, which aid in this action and stiffen the teeth. An angle-iron 34, fastened to the bottom of the scraper, may serve to further stiffen the same.

In order that the forward end of the apron 5 shall preserve proper relative position with regard to the scraper 4, it is preferable to mount or support such forward end directly on such scraper or on its frame, the shaft 35, carrying the forward supporting roll or drum 36, being journaled in brackets 37 on the side bars 18 of the shovel-frame. The shaft 9 for the rear apron-carrying roll 38 is mounted in bearings 39 at the top of adjustable standards or posts extending upwardly from the main-frame side bars. Reaches or thrust-bars 40 extend between and engage the respective shafts 9 35, so as to maintain the proper relative distance of the same and hold the apron 5 taut.

The adjustable standards for bearings 39 may be formed, as shown in Fig. 6, with turn-buckles 41 engaging screw-studs 42 43, respectively, secured to the bearings 39 and to bearings 44 on the main-frame bars 10, so that by rotating said turnbuckles the bearings 39 may be raised or lowered to adjust the relative position of bearings 39 44, so as to take up any slack in the sprocket-chain. Aprons 5 and 6 carry flights, blades, or slats 45 to enable them to act efficiently in the upward conveyance of the dirt from the shovel or scraper.

The supplementary frame for the delivery-conveyer 6 comprises two side bars or reaches 48, pivotally engaging a shaft 49, journaled in bearings in brackets 50 on one of the main-frame bars 10. The shaft 49 carries a drum 51 for supporting the conveyer-belt 6, which at the other end passes over a drum 52, pivotally mounted by shaft 53 on the outer end of the reaches 48. Said reaches or side bars 48 extend transversely across the main frame 1 and beyond the same to a sufficient distance to deliver the material so far as may be desired to one side of the ditch, and as this requires a considerable lateral extension of said side bars it is desirable to support the outer end of the same by one or more ground-wheels. For this purpose a bar 54, secured to and connecting said reaches 48, is provided with caster-wheels 55, journaled in hangers 56, pivotally mounted by swivel-pins 57 in said bar, the journal-axis of the caster-wheel being out of the vertical line of the swivel-pin 57, so that the caster will trail naturally in a direction parallel to the motion of the main frame. The pivotal mounting of the auxiliary frame for apron 6 on the main frame enables the outer end of the auxiliary frame to accommodate itself to the inequalities of the ground and to the variations or differences in the depth of the ditch.

To drive the conveyer-apron 6, we may use the mechanism shown in Figs. 3, 5, and 6, consisting of a sprocket-chain 59, engaging the sprocket-wheels 60 and 61, respectively, on the shaft 9 of the conveyer-apron and on a counter-shaft 62, parallel to shaft 9, and journaled in bearings 44 on the main-frame bars 10, and bevel-gears 64 65, respectively, on said counter-shaft 62 and on the shaft 49 of the inner drum 51 of conveyer-apron 6.

Any desired number of supporting-rollers 66 may be journaled at suitable points along the reach-bars 39 and 48 to engage under and properly support the dirt-carrying portions of the aprons 5 and 6, and guards or guide devices 67 are secured on the bars 39 at each side of the aprons 5 and 6 to retain the latter from lateral displacement.

A tie rod or brace 68 extends diagonally rearward from the front of frame 1 to the bar 54 on the supplementary frame, so as to brace the latter against the strain of traction, a turnbuckle 69 being provided in this rod to enable adjustment.

In operation the apparatus will be brought to the line of the ditch to be excavated and the scraper 4 lowered to give the proper depth of cut. In case the soil is light and sandy the scraper may be lowered to give the full depth at one cut; but in case heavy or hard soil is to be excavated the scraper will be adjusted for a shallower cut on the first operation, and as many successive cuts are taken as are necessary to dig the ditch to the required depth.

Traction means are applied to the apparatus, preferably to the forward or draft frame, and the engine 7 being started in operation the excavator is drawn forward along the line of the ditch, the scraper 4 cutting into the soil and the soil falling onto said scraper, being pushed upwardly and rearwardly thereon by the forward movement of the scraper until it falls over the rear edge of the scraper onto the conveyer 5. This conveyer is operated by engine 7 at a rate of speed sufficient to carry the material upwardly and rearwardly away from the scraper as fast as it is delivered by the latter. On reaching the rear end of conveyer 5 the material dumps or falls over onto the top of conveyer 6, which conveys it laterally over the side of the ditch and dumps it onto the ground at a distance from the ditch. Conveyer 6 is desirably run at a higher speed than conveyer 5 by suitably proportioning the gears, as shown, so that it will effectually carry away the material delivered by conveyer 5 and prevent any accumulation of material at the dumping-point on conveyer 6. It will be understood that the forward truck-wheels 2 will run on the ground in advance of the ditch, the rear truck-wheels 3 will run on the bottom of the ditch, and the caster or outboard wheels 55 will run on the ground to one side of the ditch, the excavated material being dumped outside of the line of traction of these caster-wheels.

In case on account of difficult nature of the ground or for other reasons the full depth of cut is not made on the first operation the machine will be run over the ditch a second time, the scraper 4 having first been lowered an additional amount by means of the adjusting devices thereof, and this may be repeated as often as necessary.

What we claim is—

1. In an excavator, a main frame comprising longitudinal reaches connected forwardly and rearwardly by cross-bars, ground-wheels connected to the rearward portion of said main frame, and a forward frame consisting of bars connected to said reaches and extending convergently forward and beyond the front of the main frame, and connected to said front, ground-wheels connected to the forward projecting portion of said forward frame, and a scraper carried by said main frame.

2. In an excavator, a frame, rear and forward ground-wheels connected thereto, a scraper having side arms pivoted to said frame, and braces extending from the pivotal connection of said side arms to the connection of the forward ground-wheels with the frame.

3. The combination of the main frame having reaches, side arms pivoted to said reaches and extending forwardly from the pivotal point and convergent rearwardly from their forward ends, a scraper formed with converging side plates on said arms, and bars connected with said side arms.

4. The combination of the main frame having reaches, side arms pivoted to said reaches and extending forwardly from the pivotal point and convergent rearwardly from their forward ends, a scraper formed with converging side plates on said arms, bars connected with said side arms, and means for adjustably connecting said bars to said reaches.

5. In an excavator, a frame, a scraper pivotally connected therewith and provided with means for vertical adjustment, and a brace-bar connected to the scraper intermediate its sides and provided with adjustable fastening means securing it to the frame.

6. In an excavator, a carrying-frame, a scraper adjustably connected thereto, adjustable standards on said frame, shafts journaled on said scraper and on said adjustable standards, drums on said shafts, and an endless conveyer-apron on said drums.

7. In an excavator, a carrying-frame, a scraper connected thereto, adjustable standards on said frame, shafts journaled on said scraper and on said adjustable standards, reach-bars independent of the carrying-frame connecting said shafts, drums on said shafts, and an endless conveyer-apron passing over said drums.

8. The combination with the carrying-frame and the conveyer-frame, of screw-studs connected with said frames, and a turnbuckle engaging said studs to adjust the relative position of the frames.

9. The combination of a carrying-frame, of longitudinal and lateral conveyer-aprons, shafts carrying drums for said aprons, a counter-shaft, adjustable supporting means between said counter-shaft and the shaft of a drum of the longitudinal conveyer, sprocket means connecting the shaft so adjustably supported, and bevel-gear connections between the counter-shaft and a drum-shaft of the lateral conveyer.

10. In an excavator, a scraper provided with a plurality of detachable cutting-shoes having projecting teeth the cutting edges of the shoes being in the same line.

CHARLES KERR.
   JOHN THOMAS KERR.

Witnesses to Charles Kerr:
 GEORGE T. HACKLEY,
 ARTHUR P. KNIGHT.

Witnesses to John Thomas Kerr:
 JAY SWEZEA,
 BURT L. CHAMBERS.